United States Patent [19]

Avery et al.

[11] 4,007,244

[45] Feb. 8, 1977

[54] AUTOMATED BLOW MOLDING MACHINE STARTUP

[75] Inventors: Michael J. Avery, Forrestville; Lawrence A. Martino, East Hartford; Jon D. Yonko, Vernon, all of Conn.

[73] Assignee: Monsanto Company, St. Louis, Mo.

[22] Filed: Jan. 29, 1975

[21] Appl. No.: 544,947

[52] U.S. Cl. .................. 264/99; 264/40.7; 264/150; 264/297; 264/334; 425/DIG. 206; 425/DIG. 211; 425/DIG. 212; 425/DIG. 232
[51] Int. Cl.² ........................................ B29C 17/07
[58] Field of Search ............... 264/37, 89, 90, 94, 264/98, 99, 150, 40, 334, 297; 425/326 B, DIG. 206, DIG. 211, DIG. 212, DIG. 231, DIG. 232, 302 B, 305 B

[56] References Cited

UNITED STATES PATENTS

| | | |
|---|---|---|
| 3,334,379 | 8/1967 | Di Settembrini ........... 425/326 B X |
| 3,390,430 | 7/1968 | Lynch et al. .................. 264/98 X |
| 3,537,134 | 11/1970 | Raper et al. ...................... 425/233 |
| 3,564,652 | 2/1971 | Baugnies et al. ........... 425/326 B X |
| 3,689,183 | 9/1972 | Denlinger ........................ 264/37 X |
| 3,752,629 | 8/1973 | Gordon ........................... 264/98 X |
| 3,797,985 | 3/1974 | Garver ...................... 425/387 B X |

Primary Examiner—Jan H. Silbaugh
Attorney, Agent, or Firm—Michael J. Murphy

[57] ABSTRACT

In the process of loading successive molds of a multi-station rotary blow molding machine which involves closing mold sections on portions of a continuously downwardly extruding parison adjacent the outlet of an extruder head while the molds continue to move along a circular path, improvements occuring during startup of the machine are provided which comprise directing the parison out of the path while the machine speed is brought up to design rate and then severing the parison at the outlet with a device actuated outside of the circular path and in timed coordination with the position of that mold to be loaded with the next issuing parison portion.

5 Claims, 6 Drawing Figures

AUTOMATED BLOW MOLDING MACHINE STARTUP

BACKGROUND OF THE INVENTION

This invention relates to blow molding and more particularly to method improvements in starting up a multi-station, rotary blow molding machine.

Vertically disposed, rotary blow molding machines having a plurality of circularly arranged molds equispaced from each other and adapted in operation to continuously revolve through a circular path are well known in industry and desirable versus alternative types largely because start-stop intermittent motion of the usually substantial mass of the machine is avoided. The molds successively close on portions of a deformable thermoplastic parison continuously extruding downwardly in an area generally tangential to the circular path of mold movement, and the formed article is ejected from the molds at another area of such path after being blown and cooled therein while the mold was closed and was traversing a significant portion, e.g. on the order of 270°, of such circular path. In this last respect, it is desirable to close each mold as soon and as close as possible to the head where the parison is formed in order to immediately blow it against the cooled walls of the mold cavity and then hold it in contact therewith for as long as possible before discharge so that the plastic will be well set and not subject to any substantial distortion during or after ejection. Available space in the area immediately around the extruder orifice where the sections are continuously successively closing on each other is therefore generally non-existent.

If extrusion rate is out of phase with the rate at which the molds are charged or loaded, problems result in that if extrusion is too slow with respect to machine speed, the portions of the continuous parison between successive captured sections will stretch and frequently erratically break during loading and this requires rethreading, i.e. concentrically orienting the free swaying end of the next issuing portion with respect to the oncoming mold, usually manually by hand, which can be a serious safety problem in the aforementioned cramped area adjacent the extruder outlet. On the other hand, if extrusion rate substantially exceeds rotary mold velocity, the extrudate can undesirably build up on the top face of each closing mold before the next one to be loaded moves into place. If the extrusion rate is brought up to operating level before the molding machine is started, it has been customary to manually break off lengths of the extrudate as it exits the extrusion nozzle until the linear rate is at the desired level, whereupon the machine is started and the free end presented to the first closing mold in the sense of being guided into place with a pair of hands, which is rather dangerous from a safety standpoint. In this last respect, if the length is inadequate for clamping on both ends by the mold sections, the captured portion cannot be blown since one end is not sealed by the sections and, in the past, it has been difficult to remove such non-blown (or under-blown) parison portions from the mold, frequently requiring that such removal also be done manually. The aforementioned problems are aggravated when more than one parison is being formed simultaneously.

SUMMARY OF THE INVENTION

Now, however, method improvements have been made, primarily applicable to the startup of multi-station rotary blow molding machines, which obviate prior art difficulties and make such startup as tractable as the overall operation of the system itself when operating at design rate.

Accordingly, it is a principal object of this invention to provide a method for starting up multi-station blow molding machines in a safe, convenient manner, especially the type of machine disposed in a vertical plane wherein the molds continuously revolve around a central horizontal shaft.

An additional object of this invention is to provide a method facilitating startup of such machines in a completely automatic fashion and eliminating the need for manual manipulation of the extrudate in the dangerous area immediately below the extrusion orifice.

A further object of this invention is to provide a method facilitating ejection of an unblown or incompletely blown article from the mold in which it was enclosed.

Other objects of this invention will in part be obvious and will in part appear from the following description and claims.

These and other objects are accomplished in the process of loading successive molds of a multi-station rotary blow molding machine which involves closing sections of each of said molds on portions of a continuously extruding parison adjacent the outlet of an extruder head while said molds continuously traverse an arcuate path of travel by providing improvements in such process occuring during startup of the machine prior to loading the initial mold which comprise the steps of directing the continuous parison out of said path, increasing the speed of the machine to a level such that the rate at which successive molds would be loaded with parison portions approaches the rate at which the parison issues or will issue from the head after startup, and thereafter severing the parison substantially at the outlet of the head by a device actuated outside the arcuate path of mold travel, whereby the portion exiting the head after severance is immediately clamped between closing sections of the next mold arriving beneath the head.

From an apparatus standpoint there is provided parison severing means associated with the outlet, means for actuating the severing means in timed coordination with the speed of the machine, and means for directing the continuous parison away from the machine toward recovery during startup. Mold inserts having undercuts in the pinch area may be provided to form keepers in the plastic, whether blown or not, which hold the plastic in that mold section where formed during opening.

BRIEF DESCRIPTION OF THE DRAWINGS

In describing the invention, reference will be made to the accompanying drawings wherein.

DETAILED DESCRIPTION OF THE ILLUSTRATED EMBODIMENT

Figure 1:
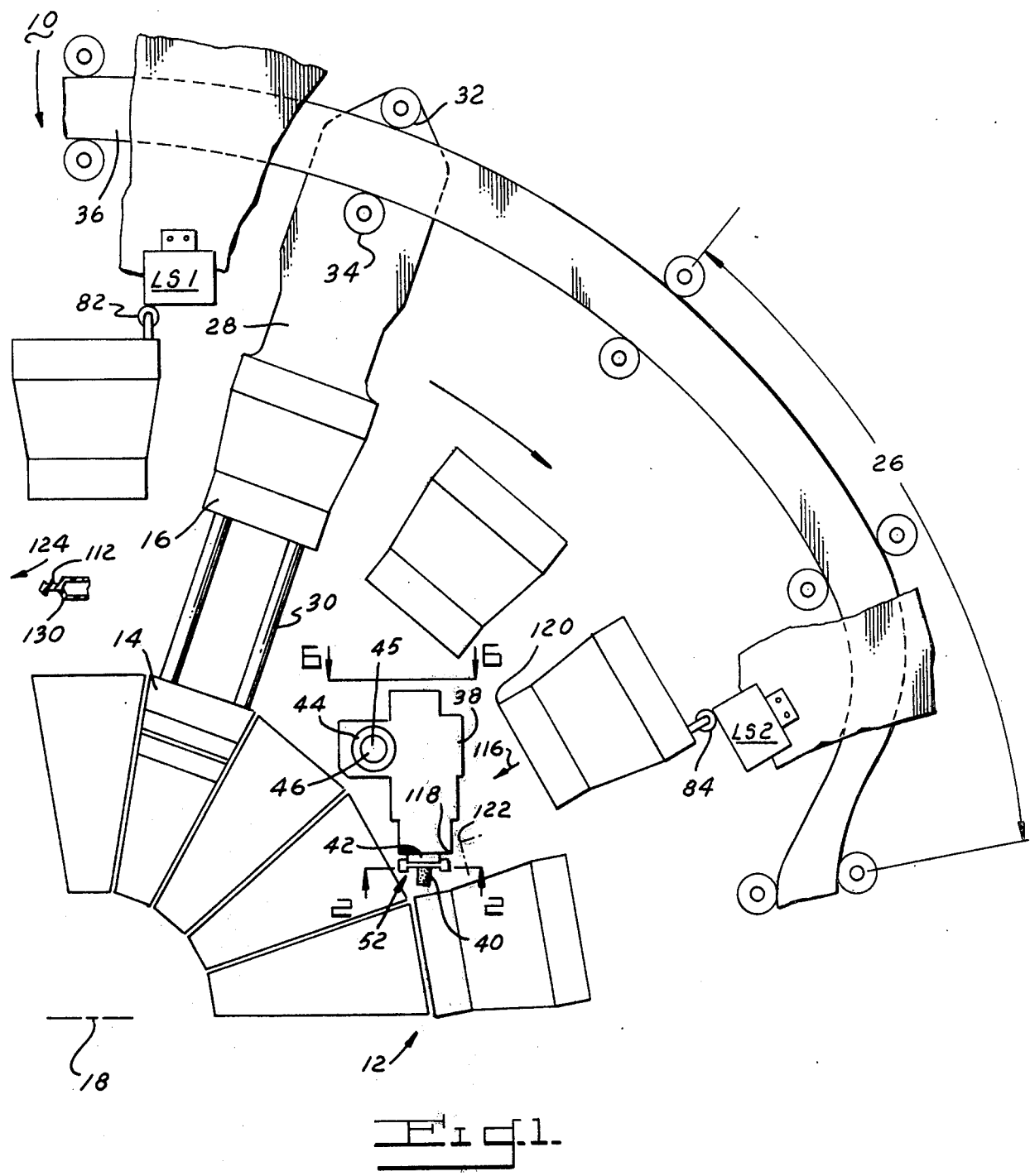
FIG. 1 is a schematic, partial front view of an assembly embodying the invention.

Referring now to the drawings, a vertically disposed, rotary, blow molding machine, generally identified as 10, is illustrated in FIG. 1 and described in detail in U.S. Pat. No. 2,784,452. In general, machine 10 comprises a plurality of molds 12, each including an inner 14 and outer 16 section equally spaced from each other on spoke-like supports, not shown, in a circular arrangement around the periphery of machine 10 and rotatable, preferably continuously, about a central horizontal axis 18. Each section 14 has a cavity portion, e.g. 20 in FIG. 6, formed in its parting face 22 which mates with a duplicate cavity portion in outer section 16 when each mold 12 is closed to form a molding cavity between them conforming in peripheral contour to that of the article to be blown therein. One or more additional cavities 24 parallel to cavity portion 20 may alternatively be provided, as desired, in each mold 12 to form additional articles per molding cycle.

Means for sequentially closing each outer section 16 on an inner section 14 during an arcuate portion 26 of the circular path of travel of the molds about axis 18 comprise a carriage 28 for each mold slidable on rails 30 under the influence of the profile surface of a mold-positioning cam plus followers 32, 34 movable with carriage 28.

Figure 6:
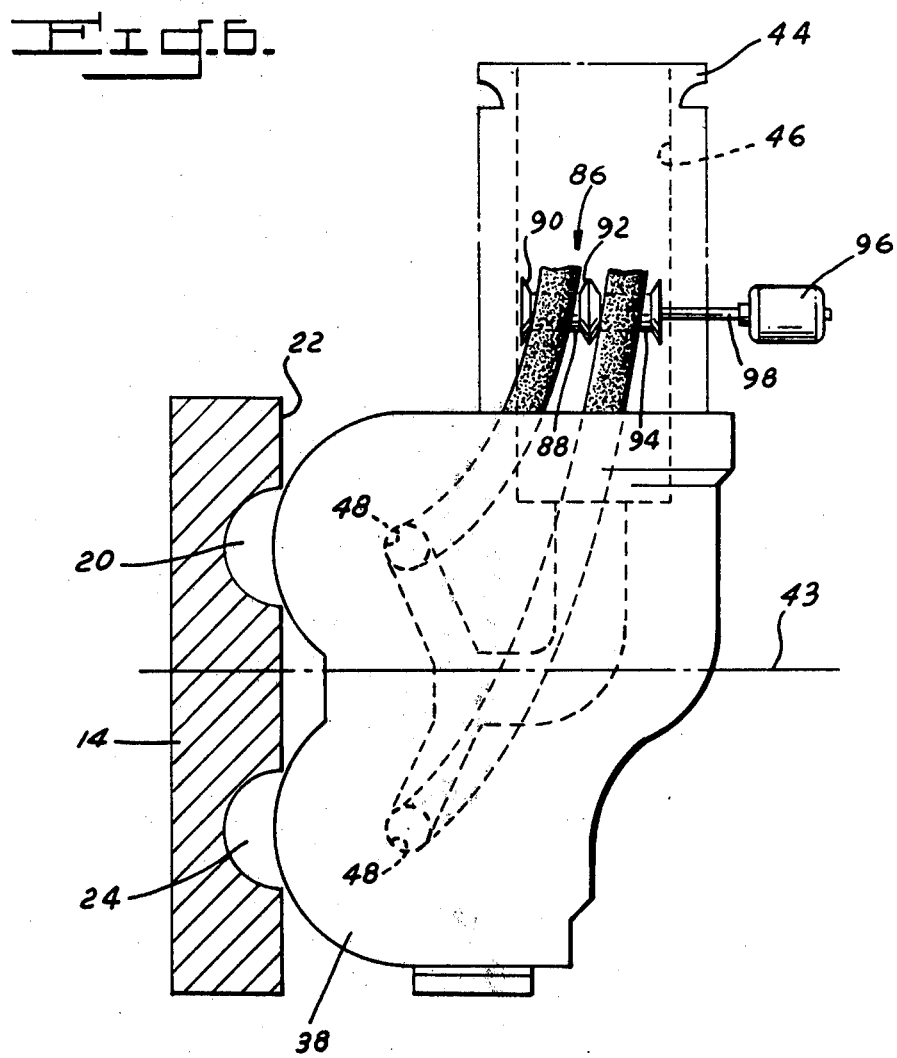
FIG. 6 is a schematic plan view generally along 6—6 of FIG. 1.

Extruder head 38 having a downwardly disposed, annular outlet 42 for shaping continuous, tubular, thermoplastic parison 40 is positioned in major portion in the vertical plane of rotation of molds 12, such plane shown as 43 in FIG. 6. Head 38 includes a flange portion 44 at its inlet which is secured in conventional manner to a mating flange on the forward end of an extruder, not shown. Central axis 45 in FIG. 1 represents an extension of the longitudinal axis of a conventional screw in such extruder, likewise not shown, but which would extend perpendicular to plane 43. Head 38 includes internal channel 46 through which molten thermoplastic flows prior to branching downwardly through one or more vertically disposed passages 48 (FIG. 6) each containing a cylindrical mandrel member 45 having an extension on its forward, lower end defining the inner surface of annular outlet 42 wherein continuous parison 40 is shaped in rather conventional manner. The outer surface of such outlet is formed by a conventional hollow ring, not shown, concentric with and surrounding such mandrel extension.

The description to this point sets forth a particular form of extrusion-blow molding assembly particularly suitable for use with the present invention. It should be realized, however, that alternative types may be equally usable therewith.

Figure 2:
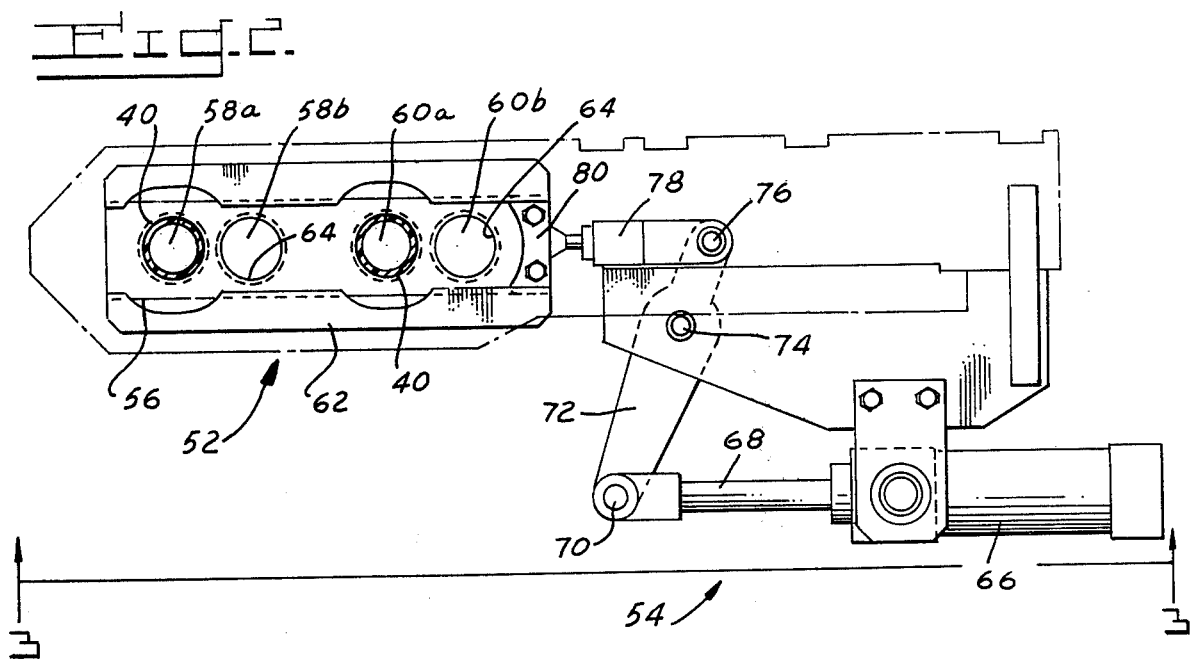
FIG. 2 is a bottom view generally in the direction 2—2 of FIG. 1.
Figure 3:
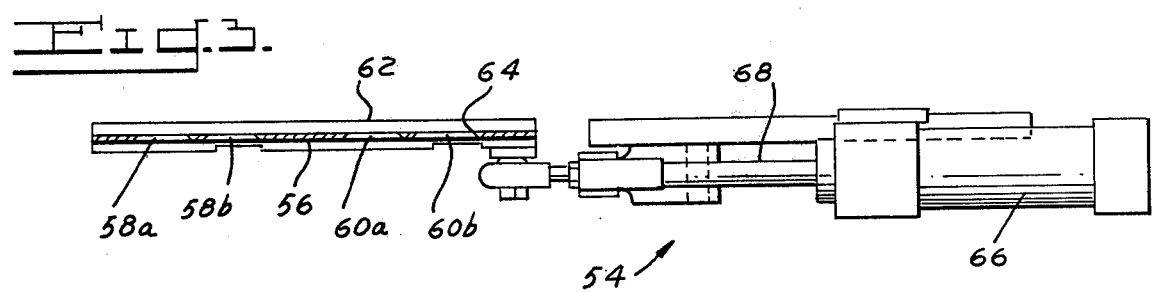
FIG. 3 is an elevational view along 3—3 of FIG. 2.

In accordance with the invention, parison severing means 52 (FIG. 2) is associated with extruder outlet 42, and in the illustrated embodiment comprises an assembly bolted on the lower face of head 38 and including horizontal plate 56 resiliently biased upwardly by conventional means such as Belleville washers, not shown, against the forwardmost surface of the extrusion ring and arranged to scrape across such surface when horizontally reciprocated in timed coordination with the rotary speed of blow molding machine 10 by means 54. Plate 56 is slidable in a track formed in carrier 62 and has two pairs 58a, 58b and 60a, 60b of adjacent, cylindrical, vertically disposed holes extending through it. The circumferential edges, for example 64, of plate 56 circumscribing holes 58, 60 function in the illustrated embodiment, as severing surfaces for parison 40 in a manner to be described. Means 52 is positioned on the outlet of head 38 such that openings 58 (and 60 with dual extrusion) are aligned with extruder outlet 42 in order that parison 40 (FIG. 2) may pass therethrough during operation of the system. Means 52 may vary in detail from that shown (for example a hot wire could be used) but should usually be dimensionally vertically thin when located in the confined region of limited dimensional extent below the extrusion outlet.

Actuating means 54, projects rearwardly of severing means 52, out of plane 43 of rotation of the molds in the general direction of the extruder axis. Means 54 may vary in detail and is exemplarily illustrated as comprising a fluid motor including cylinder 66 conventionally associated with a source of pressure, not shown, having a rod portion 68 pivoted at 70 to lever 72 which is turnable about fixed intermediate pivot 74 and is itself pivoted at its far end at 76 to extension 78 secured via bracket 80 to the end portion of plate 56. Thus, when rod 68 retracts linearly to the right from the position shown in FIG. 2, lever 72 pivots counter-clockwise about 74 to reciprocate plate 56 to the left thereby moving openings 58b and 60b into the former position of openings 58a and 60a, the latter having been displaced to the left. The reverse movement of rod portion 68 back to that shown in FIG. 2 draws plate 56 to the right to the illustrated position.

Means coordinating movement of severing means 52 with the rotary speed of machine 10 includes LS 1 (FIG. 1) comprising a conventional, industrially available limit switch mounted to a suitable bracket on machine 10 at about a 12:30 position when viewing the assembly in the direction of FIG. 1, and a similar switch, LS 2, at about a 2:30 position. Probes 82 and 84 on a portion of carriage 28 of a particular pair of mold stations of machine 10 are in the same vertical plane as that of LS 1 and LS 2 and project outwardly a sufficient distance as to strike such limit switches when passing thereby.

Means such as 86, FIG. 6, for temporarily directing continuous parison 40 away from machine 10 during startup of the system are provided laterally of extrusion outlet 42 out of the plane 43 of rotation of molds 12, and preferably vertically somewhere between outlet 42 and the point (FIG. 1) where each mold 12 beneath outlet 42 is fully closed. One form of means 86 comprises a journaled roller 88 having flanged ends 90, 92 and a width at least as great as that of the diameter of parison 40 issuing from head 38. Similarly constructed additional rollers 94 integral with roller 88 may be used with a plural parison extrusion system. Conventional means, such as electric motor 96 coupled via shaft 98 to rollers 88, 94 can be used to rotate same, or alternatively, the friction of the downwardly issuing parison against the cylindrical surface of the journaled rollers may be adequate to cause rotation. In the embodiment described, means 86 is suspended by conventional supports, not shown, from below the extruder and/or lower face of the inlet portion of head 38.

Figure 4:
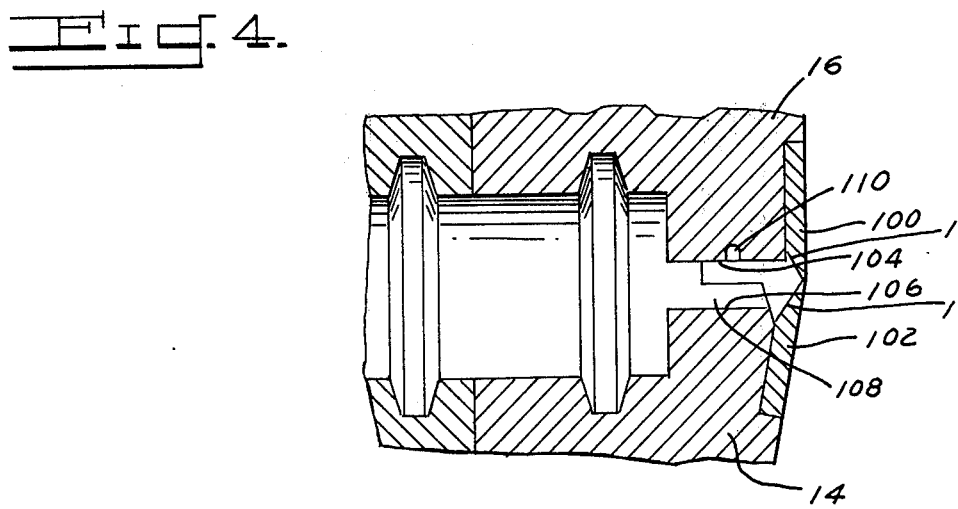
FIG. 4 is a partial, sectional view of a mold portion illustrating an inventive feature.
Figure 5:
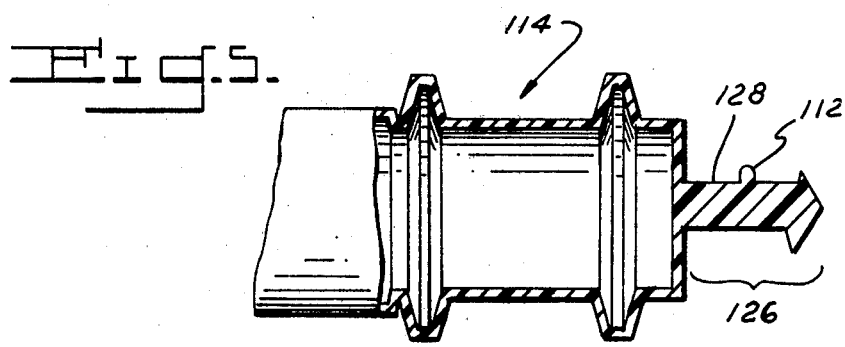
FIG. 5 is a sectional view of a portion of an article formed in the cavity of the mold of FIG. 4.

Referring now to FIGS. 4, 5 where a feature is illustrated, each inner 14 and outer 16 section of a mold 12 has rather conventional plates 100, 102 secured in slots formed in the end face of an insert in the mold sections and which have matching pinch surfaces 101, 103 tapering to a clamping edge for squeezing opposing walls of parison 40 together on closing the mold. Similar structure, not shown, if formed at the opposite end of the mold for clamping the other end of the parison. In the illustrated embodiment, such pinch surfaces are extended back toward the cavity of the mold by means of flat faces 104, 106 which together define compression molding cavity 108 therebetween. Face 104 of such pinch extension of each outer section 16 has one or more undercuts formed therein, such as hemispherical depression 110 which, on closing the sections forms a keeper 112 (FIG. 5) in the plastic in the pinch area matching the mold surface forming it.

In normal operation of the extrusion-blow molding system described, one or more parisons 40 simultaneously continuously issue downwardly from annular outlet 42 of head 38 in the plane 43 of rotation of molds 12 and, in the embodiment illustrated, in an area of the circular path of travel thereof where the sections 14, 16 are fully radially separated, i.e. out of contact with each other, yet wherein mold closing within envelope 26 has started to occur. This corresponds with a position in outlet 42 of approximately 2 to 2:30 o'clock with respect to FIG. 1. Each inner section 14 is radially positioned such that as it is moved arcuately downwardly by outlet 42 it is substantially tangential to or just touches a just-extruded portion of parison 40 such that the latter is deposited or positioned lengthwise along face 22 of a section 14 containing cavities 20, 24. As the particular mold being loaded with a parison portion continues downwardly toward the position of the vertically lowermost mold in FIG. 1, its outer section 16 under the influence of followers 32, 34 and the contour of cam 36, is urged radially (i.e. in direction 116 in FIG. 1) inwardly towards axis 18 and its mating inner section 14 beyond and immediately adjacent edge 118 of extruder head 38, while both sections continue to traverse their circular path, such action commencing and eventually closing each such mold. As suggested previously, it is desirable to close a mold as early as possible after loading with a parison portion and therefore corner edge 120 (FIG. 1) preferably just clears edge 118 of head 38 during closing, and an intermediate position is shown at 122 in FIG. 1.

In accordance with the invention, applicable to the startup of machine 10 prior to loading the initial mold with a parison portion in the manner just described, the linear rate of extrusion through outlet 42 for the particular capacity of the system is gradually increased to design level. The initial forward end of the extrudate is manually (or by an automated gripping means) looped or threaded over the rotating guide roller(s) of means 86 to temporarily divert the downwardly issuing parison 40 out of the circular path of travel of the molds while the linear rate of issuance of the parison from the outlet is gradually increased and more particularly as in FIG. 6, to temporarily direct such parison out of the region immediately adjacent outlet 42 through substantially a ninety degree turn toward the extruder supplying plastic to head 38. Machine 10 which preferably, though not necessarily, has been stopped up to this point is now brought to a position, (e.g. via an electric switch and motor for turning the central shaft not shown) such that probe 82 engages LS 1 and probe 84 is in similar engagement with LS 2. As illustrated in FIG. 1, this places the mold associated with probe 82 at about a 12 o'clock position and that with probe 84 in a position straddling head 38 at about 2:30 o'clock. A severing means actuation switch electrically associated with a solenoid in the fluid supply and return lines to cylinder 66 of the fluid motor actuating the severing device is then engaged as is a machine-start switch if the machine is stopped, both being rather conventional and therefore not shown. The severing means 52, however, is not actuated until probe 82 engages LS 2, the time elapsed between commencement of rotation of the machine (i.e. when probe 84 engaged LS 2) and the engagement of probe 82 with LS 2 being that typically illustrative of what is necessary to bring the rotary speed of the large mass of the machine up to design rate from an initial stop position. When probe 82 engages LS 2 an electrical signal generated by conventional circuitry, not shown, actuates a solenoid in the system of actuating means 54 to slide plate 56 to the left in an automated manner to sever the parison in the extrusion outlet. By virtue of the existence and placement of the probes and limit switches, such severence is in timed coordination with the circumferential position of the next mold after that associated with probe 82, (schematically referenced by arrowed numeral 124 in FIG. 1) which will be the first mold to be fully loaded with the portion of continuous parison 40 issuing from outlet 42 after edge(s) 64 of reciprocating plate 56 severs the parison at the extrusion outlet. Therefore, when the sections of mold 124 close immediately below outlet 42, enough length of parison will have been extruded subsequent to the prior severing action as to be adequate for clamping in two places via pinch plates, such as 100, 102, on either end of the sections comprising mold 124. In this manner, adequate plastic to permit blowing a complete article is provided in the very first mold to be loaded during startup, thus avoiding the necessity to manually remove unblown parts from the molds at the conventional 12:00 o'clock discharge area (FIG. 1) of the articles from the machine. The sequencing and specifics of the switches and circuitry for accomplishing full charging of the first mold may be varied from that previously described. For example, it may be possible to utilize a conventional, adjustable time delay relay in the circuitry to delay actuation of the severing assembly after initial activation until machine design speed is reached. It may also be possible to have the machine turning at some speed before extrusion starts and to pull the initial forward end of the parison out to means 86 via an extension handle and picker inserted into plane 43 manually just below the outlet and above the fully closed mold position.

As a feature of the invention, if desirable to positively insure that the parison portion captured initially by the first mold to be loaded after startup is ejected at the 12:00 o'clock position, or for that matter at any time, the mold configuration illustrated in FIG. 4 may be used. With such configuration in the pinch area, on closing the sections, a portion (FIG. 5) of the plastic will be compression molded into configuration 126 which includes keeper portion 112 formed by depression 110 in the outer mold section 16 and which therefore projects from side 128 of compression molded portion 126 toward section 16. Thereafter, as outer section 16 conventionally moves away from inner section 14 along the portion of the circular path, not shown, prior to reaching a 12:00 o'clock position in FIG. 1, the length of plastic within the mold in which keeper 112 has been previously formed during mold closing, which need not be sufficiently long to permit blowing an article at all, is carried outwardly in outer section 16 and held therein as a result of engagement of keeper 112 with the surface of depression 110. Then, when perhaps only partially formed part 130 is ejected from section 16 in rather conventional manner such as by a cam-actuated knock-out pin, not shown, reciprocated against part 130, keeper 112 will be forcibly disengaged from mold depression 110 at the predetermined point in the circular path of travel of the mold. Thus, regardless of whether an article is blown in the mold or not, with the feature described, positive means for insuring ejection of all plastic from the mold are provided, assuming that some squeezing together or compression molding has occured during mold closing. Such keeper-forming means need not be confined to an environment related to machine startup but are likewise useful when any malfunction occurs causing incomplete forming after the machine is in operation. Alternative forms of undercuts of different sizes and contoured differently from that shown are equally functional - the point being that the location to insure ejection whether blown or not is such that the keeper is formed in compression surfaces during mold closing independent of the action of the blow air.

Various modifications and alterations will be readily suggested to persons skilled in the art. It is intended therefore, that the foregoing be considered as exemplary only and that the scope of the invention be ascertained from the following claims.

What is claimed is:

1. In the process of loading successive molds of a multistation, rotary blow molding machine which involves:
   closing sections of each of said molds on portions of a continuously extruding parison in a confined region of limited dimensional extent adjacent the outlet of an extruder head while said molds continuously traverse an arcuate path of travel;
   the improvements in such process occuring during startup of the machine prior to loading the initial mold comprising the steps of:
   a. directing the continuous parison out of said region;
   b. increasing the speed of the machine to a level such that the rate at which successive molds would be loaded with parison portions approaches the rate at which the parison issues or will issue from the head after startup while maintaining the parison directed out of said region without manual manipulation thereof; and thereafter
   c. severing the parison substantially at the outlet of the head by a device actuated outside said arcuate path of travel;
   whereby the parison portion exiting the head after severance is immediately clamped between closing sections of the next mold arriving beneath the head.

2. The process of claim 1 wherein the parison is directed out of said region through substantially a ninety degree turn from the outlet of the head toward an extruder supplying plastic to the head.

3. In the process of loading successive molds of a vertically disposed, rotary blow molding machine, which comprises:
   issuing a thermoplastic parison continuously downwardly from an extruder head disposed in the plane of rotation of the molds in an area of a circular path of travel thereof where sections of each mold are separated from each other; and then
   urging an outer section of each mold radially inwardly along said plane through a confined region of limited dimensional extent in close proximity to the head toward an inner section while each such mold continues to move in said path and such parison portion is deposited lengthwise along the mold parting line to commence closing of each such mold;
   the improvements in such process occuring during startup of the machine prior to loading the initial mold, comprising the steps of:
   a. directing the downwardly issuing continuous parison out of said region;
   b. increasing the rotary speed of the machine to a level such that the rate of loading successive molds substantially matches the rate of issuance of the parison from the head while maintaining the parison directed out of said region without manual manipulation thereof; and thereafter
   c. severing the parison adjacent the outlet of the head by a remotely actuated device;
   whereby the portion of the parison issuing from the head after severance is captured by the next mold arriving at the head.

4. In the process of loading successive molds of a vertically disposed rotary blow molding machine with portions of a thermoplastic parison which process comprises:
   issuing at least two parisons simultaneously continuously downwardly from the outlet of an extruder head disposed in the plane of rotation of the molds in an area of a circular path of travel of the molds where the sections of each are fully radially separated from each other such that a portion of each such parison is substantially deposited lengthwise along inner sections of each such open mold; and then
   urging an outer section of each mold radially inwardly along said plane toward its inner section beyond and closely adjacent a surface portion of the head while each such mold continues to move in said path to commence closing of each such mold;
   the improvements in such process occuring during startup of the machine prior to loading the initial mold, comprising the steps of:
   a. temporarily directing the downwardly issuing parisons out of said circular path while increasing the rotary speed of the machine to a predetermined level and maintaining the parisons directed out of said path without manual manipulation thereof; and thereafter
   b. severing the parisons adjacent said outlet with an automated device after passage of a time interval substantially equal to that necessary to bring such speed to the predetermined level from a stopped condition;
   whereby the mold to be first loaded after such severing is loaded with parison portions of sufficient length to be clamped at either end by the mold sections when closed.

5. The process of claim 4 including the steps of:
   compression molding a keeper in each thermoplastic of the parison on the side facing the outer mold section during mold closing; and thereafter
   moving the outer mold section away from the inner section with each parison portion held in the outer section as a result of engagement of the keeper with the surface of the outer mold section defining the keeper; and then
   disengaging the keeper and outer mold section surface at a predetermined point in the circular path of travel of the molds.

* * * * *